United States Patent
Frey (10) Patent No.: US 9,618,647 B2
(45) Date of Patent: Apr. 11, 2017

(54) GAIN COMPENSATED SYMMETRIZED AND ANTI-SYMMETRIZED ANGLES

(71) Applicant: Schlumberger Technology Corporation, Sugar Land, TX (US)

(72) Inventor: Mark T. Frey, Sugar Land, TX (US)

(73) Assignee: SCHLUMBERGER TECHNOLOGY CORPORATION, Sugar land, TX (US)

(*) Notice: Subject to any disclaimer, the term of this patent is extended or adjusted under 35 U.S.C. 154(b) by 148 days.

(21) Appl. No.: 14/525,088

(22) Filed: Oct. 27, 2014

(65) Prior Publication Data

US 2016/0116628 A1    Apr. 28, 2016

(51) Int. Cl.
*G01V 3/30* (2006.01)
*G01V 3/26* (2006.01)

(52) U.S. Cl.
CPC . *G01V 3/30* (2013.01); *G01V 3/26* (2013.01)

(58) Field of Classification Search
CPC .............. G01V 3/30; G01V 3/12; G01V 3/38
See application file for complete search history.

(56) References Cited

U.S. PATENT DOCUMENTS

| | | |
|---|---|---|
| 5,594,343 A | 1/1997 | Clark et al. |
| 5,757,191 A | 5/1998 | Gianzero |
| 6,163,155 A | 12/2000 | Bittar |
| 6,476,609 B1 | 11/2002 | Bittar |
| 6,819,111 B2 | 11/2004 | Fanini et al. |

(Continued)

FOREIGN PATENT DOCUMENTS

| | | |
|---|---|---|
| EP | 0721111 B1 | 8/2002 |
| WO | 2013169638 A1 | 11/2013 |

(Continued)

OTHER PUBLICATIONS

Zhong, "DDRB Measurement Construction", Retrieved from the Internet: URL: http://omniworks.slb.com/support/OmniWorks/ARL/Fetch/File?objName=em_ans\DDR_EMLA\FwdModeling\Core\DDRB_measurement_construction.docx.

(Continued)

*Primary Examiner* — Huy Q Phan
*Assistant Examiner* — Alvaro Fortich (57) ABSTRACT

A method for making downhole electromagnetic logging while drilling measurements includes rotating an electromagnetic logging while drilling tool in a subterranean wellbore. The logging tool includes a plurality of transmitter antennas and a plurality of receiver antennas symmetrically spaced along a logging while drilling tool body, the plurality of transmitter antennas including at least one axial transmitter antenna and at least one transverse transmitter antenna. The plurality of receiver antennas includes at least one axial receiver antenna and at least one transverse receiver antenna. The receiver antennas are used to acquire electromagnetic voltage measurements while rotating. The voltage measurements are processed to compute harmonic voltage coefficients, selected ratios of which are processed to compute gain compensated symmetrized and anti-symmetrized quantities and angles. These quantities may optionally be further processed to compute rotated gain compensated symmetrized and anti-symmetrized quantities.

19 Claims, 10 Drawing Sheets

(56) References Cited

U.S. PATENT DOCUMENTS

| | | |
|---|---|---|
| 6,911,824 B2 | 6/2005 | Bittar |
| 6,969,994 B2 | 11/2005 | Minerbo et al. |
| 7,019,528 B2 | 3/2006 | Bittar |
| 7,138,803 B2 | 11/2006 | Bittar |
| 7,202,670 B2 | 4/2007 | Omeragic et al. |
| 7,265,552 B2 | 9/2007 | Bittar |
| 7,536,261 B2 | 5/2009 | Omeragic et al. |
| 7,557,579 B2 | 7/2009 | Bittar |
| 7,557,580 B2 | 7/2009 | Bittar |
| 7,612,565 B2 | 11/2009 | Seydoux et al. |
| 7,612,566 B2 | 11/2009 | Merchant et al. |
| 7,656,160 B2 * | 2/2010 | Legendre ............ G01V 3/28 324/339 |
| 7,659,722 B2 | 2/2010 | Bittar |
| 7,663,372 B2 | 2/2010 | Signorelli et al. |
| 7,733,093 B2 | 6/2010 | Homan et al. |
| 7,755,361 B2 | 7/2010 | Seydoux et al. |
| 7,787,633 B2 | 8/2010 | Costello et al. |
| 7,915,895 B2 | 3/2011 | Chemali et al. |
| 7,948,238 B2 | 5/2011 | Bittar |
| 7,990,153 B2 | 8/2011 | Streinz et al. |
| 7,991,555 B2 | 8/2011 | Yang et al. |
| 8,085,049 B2 | 12/2011 | Bittar |
| 8,117,018 B2 | 2/2012 | Fang et al. |
| 8,129,993 B2 | 3/2012 | Yang et al. |
| 8,193,813 B2 | 6/2012 | Seydoux et al. |
| 8,222,902 B2 | 7/2012 | Bittar et al. |
| 8,274,289 B2 | 9/2012 | Bittar et al. |
| 8,466,683 B2 * | 6/2013 | Legendre ............ G01V 3/28 324/339 |
| 2003/0184304 A1 * | 10/2003 | Homan ............ G01V 3/28 324/343 |
| 2005/0083063 A1 * | 4/2005 | Omeragic ............ G01V 3/28 324/338 |
| 2007/0024286 A1 | 2/2007 | Wang |
| 2008/0078550 A1 | 4/2008 | Chatterji et al. |
| 2009/0015261 A1 * | 1/2009 | Yang ............ G01V 3/28 324/343 |
| 2010/0283469 A1 | 11/2010 | Wang |
| 2010/0286916 A1 | 11/2010 | Wang |
| 2011/0074427 A1 | 3/2011 | Wang et al. |
| 2011/0140701 A1 * | 6/2011 | Legendre ............ G01V 3/28 324/339 |
| 2011/0199088 A1 | 8/2011 | Bittar |
| 2011/0238312 A1 | 9/2011 | Seydoux et al. |
| 2011/0291855 A1 | 12/2011 | Homan et al. |
| 2011/0309833 A1 * | 12/2011 | Yang ............ G01V 3/28 324/338 |
| 2012/0105076 A1 | 5/2012 | Li et al. |
| 2012/0117655 A1 | 5/2012 | Bettini et al. |
| 2012/0242342 A1 | 9/2012 | Rabinovich et al. |
| 2012/0249149 A1 | 10/2012 | Bittar et al. |
| 2012/0253676 A1 | 10/2012 | Dong et al. |
| 2013/0035862 A1 | 2/2013 | Fang et al. |
| 2013/0166213 A1 * | 6/2013 | Homan ............ G01V 3/30 702/7 |
| 2013/0191028 A1 | 7/2013 | Homan et al. |
| 2013/0301388 A1 | 11/2013 | Hartmann et al. |
| 2013/0304384 A1 | 11/2013 | Rabinovich et al. |
| 2014/0107929 A1 * | 4/2014 | Zhong ............ G01V 3/26 702/7 |

FOREIGN PATENT DOCUMENTS

| | | |
|---|---|---|
| WO | WO2014003701 A1 | 1/2014 |
| WO | WO2014003702 A1 | 1/2014 |
| WO | 2015027010 A1 | 2/2015 |

OTHER PUBLICATIONS

International Search Report issued in related PCT application PCT/US2015/057468 on Jan. 28, 2016, 3 pages.

* cited by examiner

GAIN COMPENSATED SYMMETRIZED AND ANTI-SYMMETRIZED ANGLES

CROSS REFERENCE TO RELATED APPLICATIONS

None.

FIELD OF THE DISCLOSURE

Disclosed embodiments relate generally to downhole electromagnetic logging methods and more particularly to a logging tool and a method for making gain compensated directional propagation measurements, such as fully compensated symmetrized and anti-symmetrized directional measurements and fully compensated symmetrized and anti-symmetrized angles.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements are commonly inverted at the surface using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently significantly more complex than the formation models used in the inversion. The use of a three-dimensional matrix of propagation measurements may enable a full three-dimensional measurement of the formation properties to be obtained as well as improve formation imaging and electromagnetic look ahead measurements. However, there are no known methods for providing a fully gain compensated tri-axial propagation measurement, nor of a fully gain compensated quantity that is aligned with formation heterogeneities.

SUMMARY

A method for making downhole electromagnetic logging while drilling measurements is disclosed. The method includes rotating an electromagnetic logging while drilling tool in a subterranean wellbore. The logging tool includes a plurality of transmitter antennas and a plurality of receiver antennas symmetrically spaced along a logging while drilling tool body. The plurality of transmitter antennas includes at least one axial transmitter antenna and at least one transverse transmitter antenna, and the plurality of receiver antennas includes at least one axial receiver antenna and at least one transverse receiver antenna. A plurality of electromagnetic voltage measurements is acquired using the plurality of receiver antennas while rotating. The voltage measurements are processed to compute harmonic voltage coefficients, selected ratios of which are processed to compute gain compensated symmetrized and anti-symmetrized quantities and angles. These quantities may optionally be further processed to compute rotated gain compensated symmetrized and anti-symmetrized quantities.

The disclosed embodiments may provide various technical advantages. For example, the disclosed methodology provides for the measurement of gain compensated symmetrized and anti-symmetrized quantities and angles. These quantities may allow for separate detection of bed boundary direction and formation anisotropy direction which may improve geosteering capabilities. Moreover, the disclosed embodiments may enable a direction of eccentering of the tool in the borehole to be separated from a direction of formation anisotropy. Separating these effects tends to enable a robust borehole correction.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
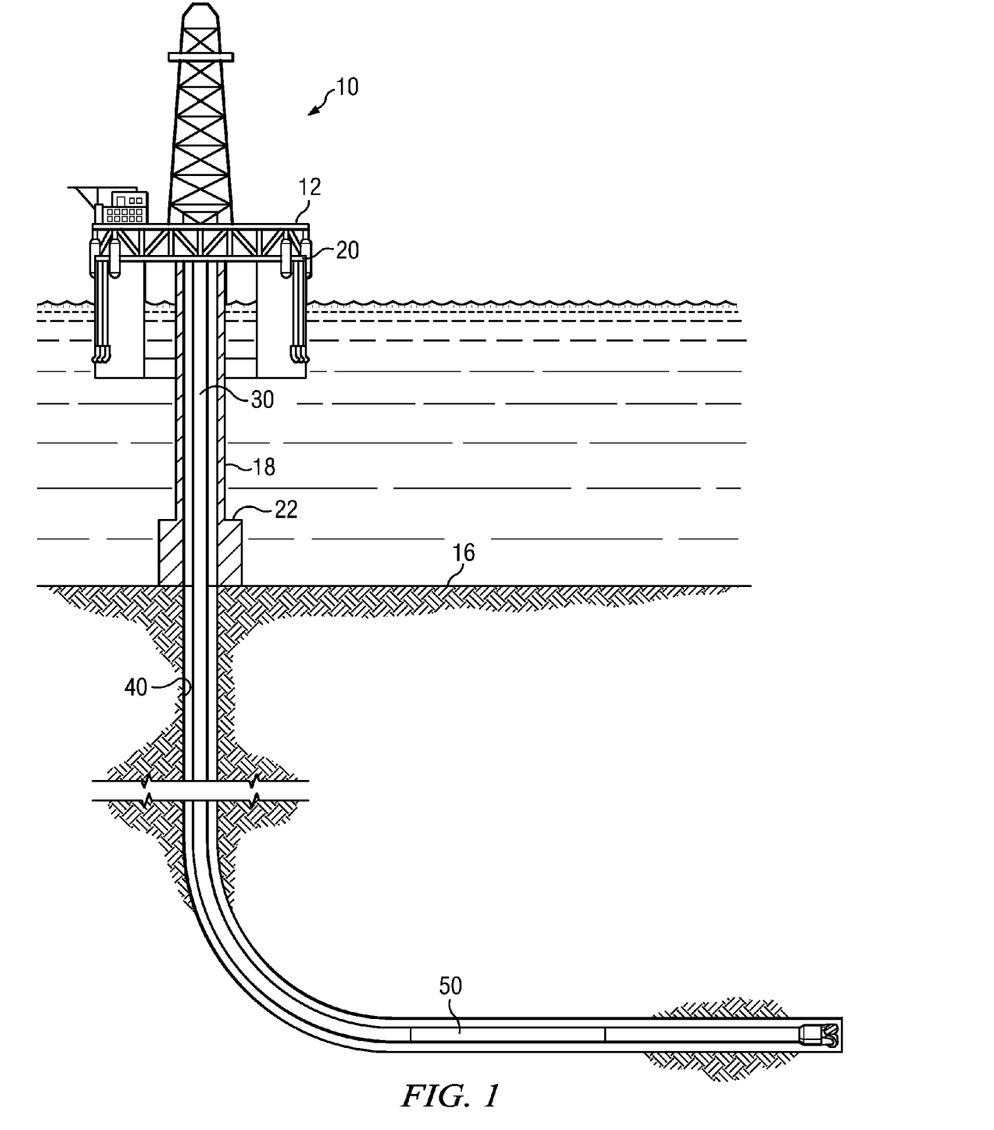
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multiple orthogonal antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
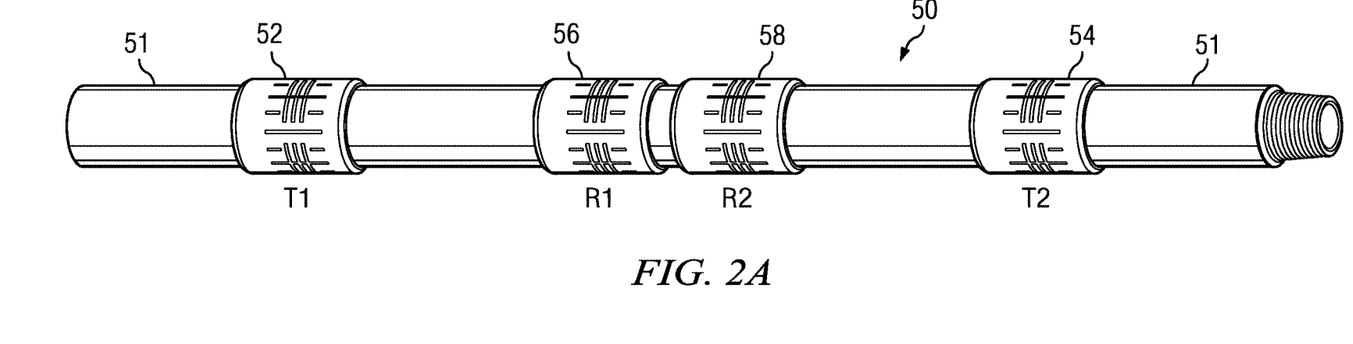
FIG. 2A depicts one example of the electromagnetic logging tool shown on FIG. 1.

FIG. 2A depicts one example of an electromagnetic measurement tool 50. In the depicted embodiment measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. As described in more detail below, each of the transmitters 52 and 54 and receivers 56 and 58 includes at least one transverse antenna and may further include an axial antenna. For example, the transmitters and receivers may include a bi-axial antenna arrangement including an axial antenna and a transverse (cross-axial) antenna. In another embodiment, the transmitters and receivers may include a tri-axial antenna arrangement including an axial antenna and first and second transverse antennas that are orthogonal to one another. As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

Figure 2B:
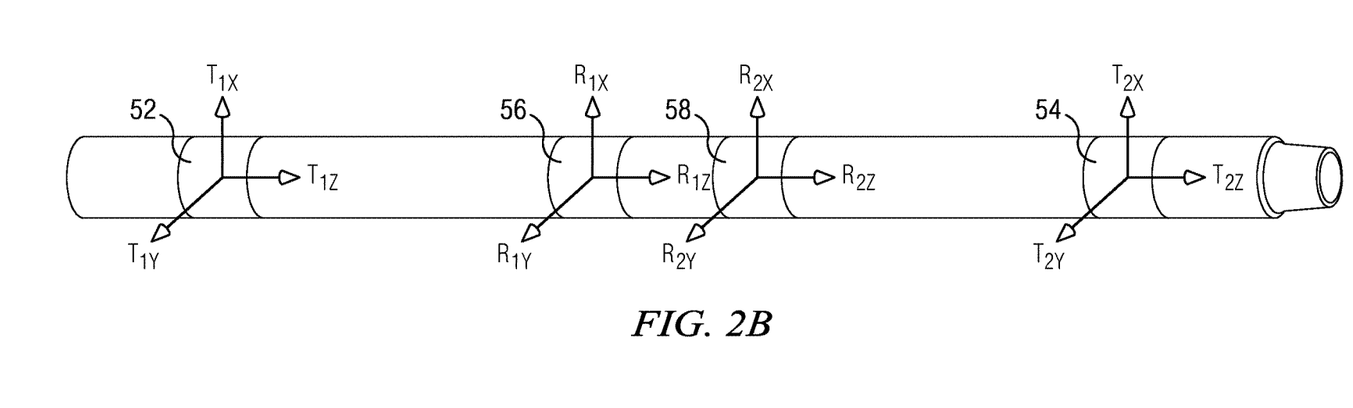
FIG. 2B schematically depicts the antenna moments in an electromagnetic logging tool including triaxial transmitters and receivers.

FIG. 2B depicts transmitter and receiver moments (magnetic dipoles) of one embodiment of measurement tool 50 in which the transmitters 52, 54 and receivers 56, 58 each include a tri-axial antenna arrangement. Each of the transmitters 52, 54 includes an axial antenna $T1_z$ and $T2_z$ and first and second transverse antennas $T1_x$, $T1_y$ and $T2_x$, $T2_y$. Likewise, each of the receivers 56, 58 includes an axial antenna $R1_z$ and $R2_z$ and first and second transverse antennas $R1_x$, $R1_y$ and $R2_x$, $R2_y$. It will be understood that the disclosed embodiments are not limited to a tri-axial antenna configuration such as that depicted on FIG. 2B.

Figure 3A:
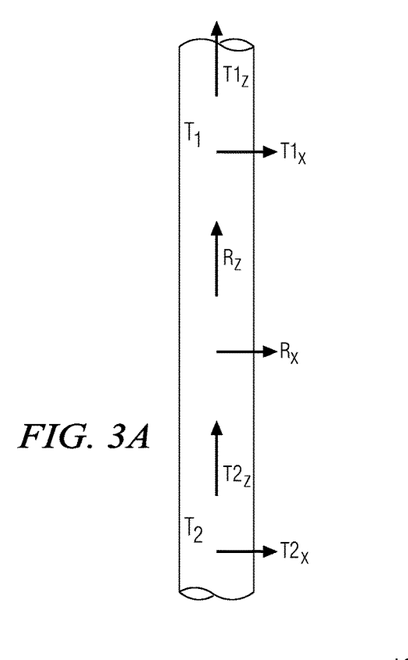
FIGS. 3A and 3B (collectively FIG. 3) depict antenna moments for various example transmitter and receiver configurations for obtaining gain compensated symmetrized and anti-symmetrized quantities.
Figure 3B:
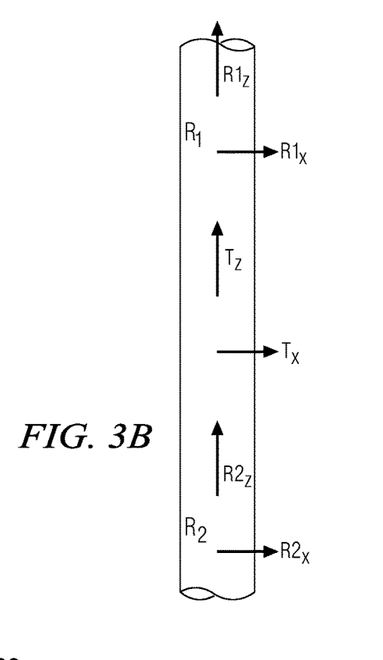

It will be understood that a tool configuration including collocated tri-axial transmitter and receiver embodiments (e.g., as depicted on FIG. 2B) is not required to obtain the gain compensated symmetrized and anti-symmetrized quantities disclosed herein. Substantially any antenna arrangement having axial symmetry may be used. FIGS. 3A and 3B (collectively FIG. 3) depict antenna moments for various example transmitter and receiver configurations for obtaining gain compensated symmetrized and anti-symmetrized quantities. FIG. 3A depicts an embodiment including an axial receiver antenna $R_z$ and a transverse receiver antenna $R_x$ deployed axially between first and second transmitters T1 and T2. Each of the transmitters includes an axial transmitter antenna $T1_z$ and $T2_z$ and a transverse transmitter antenna $T1_x$ and $T2_x$. FIG. 3B depicts an embodiment including an axial transmitter antenna $T_z$ and a transverse transmitter antenna $T_x$ deployed axially between first and second receivers R1 and R2. Each of the receivers includes an axial receiver antenna $R1_z$ and $R2_z$ and a transverse receiver antenna $R1_x$ and $R2_x$. While the embodiments depicted on FIG. 3 include non-collocated antennas it will be understood that the axial and transverse transmitter and receiver antennas may optionally be collocated.

Figure 4:
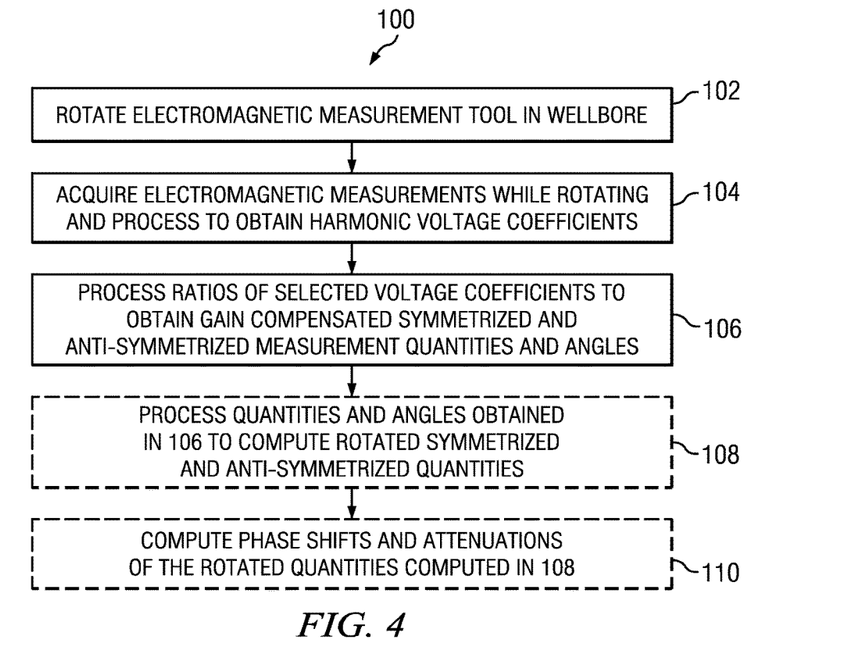
FIG. 4 depicts a flow chart of one disclosed method embodiment for obtaining gain compensated symmetrized and anti-symmetrized quantities and angles.

FIG. 4 depicts a flow chart of one disclosed method embodiment 100 for obtaining gain compensated symmetrized and anti-symmetrized quantities and angles. An electromagnetic measurement tool (e.g., one of the measurement tools depicted on FIGS. 2 and 3) is rotated in a subterranean wellbore at 102. Electromagnetic measurements are acquired at 104 while the tool is rotating and processed to obtain harmonic voltage coefficients. Ratios of selected harmonic voltage coefficients may then be processed to compute gain compensated symmetrized and anti-symmetrized quantities and angles at 106. The gain compensated symmetrized and anti-symmetrized quantities and angles may then be optionally further processed at 108 to compute rotated symmetrized and anti-symmetrized measurement quantities (e.g., rotated to line up with heterogeneities in the subterranean formation) and at 110 to compute phase shifts and attenuations of the rotated symmetrized and anti-symmetrized measurement quantities.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae can be processed, as is known to those of ordinary skill in the art, to obtain one or more properties of the formation.

In general the earth is anisotropic such that its electrical properties may be expressed as a three-dimensional tensor that contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIG. 2B form a three-dimensional matrix and thus may have sensitivity to a full three-dimensional formation impedance tensor. For example, a three-dimensional matrix of measured voltages V may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the three-dimensional matrix of measured voltages with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 from a firing of the x-axis antenna of transmitter T1.

When bending of the measurement tool is negligible (e.g., less than about 10 degrees), the three dimensional voltage matrix may be modeled mathematically, for example, as follows:

$$V_{ij} = G_{Ti}(R_\theta{}^t Z_{ij} R_\theta) G_{Rj} \quad (2)$$

where $Z_{ij}$ represent the transfer impedances as described above, $G_{Ti}$ and $G_{Rj}$ are diagonal matrices representing the transmitter and receiver gains, $R_\theta$ represents the rotation matrix about the z-axis through angle θ, and the superscript t represents the transpose of the corresponding matrix. The gain and rotation matrices in Equation 2 may be given, for example, as follows:

$$G_{Ti} = \begin{bmatrix} g_{Tix} & 0 & 0 \\ 0 & g_{Tiy} & 0 \\ 0 & 0 & g_{Tiz} \end{bmatrix} \quad (3)$$

$$G_{Rj} = \begin{bmatrix} g_{Rjx} & 0 & 0 \\ 0 & g_{Rjy} & 0 \\ 0 & 0 & g_{Rjz} \end{bmatrix} \quad (4)$$

$$R_\theta = \begin{bmatrix} \cos(\theta) & -\sin(\theta) & 0 \\ \sin(\theta) & \cos(\theta) & 0 \\ 0 & 0 & 1 \end{bmatrix} \quad (5)$$

The rotated couplings (shown in the parentheses in Equation 2) may be expressed mathematically in harmonic form, for example, as follows:

$$R_\theta{}^t Z_{ij} R_\theta = Z_{DC\_ij} + Z_{FHC\_ij}\cos(\theta) + Z_{FHS\_ij}\sin(\theta) + Z_{SHC\_ij}\cos(2\theta) + Z_{SHS\_ij}\sin(2\theta) \quad (6)$$

where $Z_{DC\_ij}$ represents a DC (average) coupling coefficient, $Z_{FHC\_ij}$ and $Z_{FHS\_ij}$ represent first order harmonic cosine and first order harmonic sine coefficients, and $Z_{SHC\_ij}$ and $Z_{SHS\_ij}$ represent second order harmonic cosine and second order harmonic sine coefficients of the ij transmitter receiver couplings. These coefficients are shown below:

$$Z_{DC\_ij} = \begin{bmatrix} \frac{Z_{ijxx}+Z_{ijyy}}{2} & \frac{(Z_{ijxy}-Z_{ijyx})}{2} & 0 \\ \frac{-(Z_{ijxy}-Z_{ijyx})}{2} & \frac{Z_{ijxx}+Z_{ijyy}}{2} & 0 \\ 0 & 0 & Z_{ijzz} \end{bmatrix} \quad (7)$$

$$Z_{FHC\_ij} = \begin{bmatrix} 0 & 0 & Z_{ijxz} \\ 0 & 0 & Z_{ijyz} \\ Z_{ijzx} & Z_{ijzy} & 0 \end{bmatrix}$$

$$Z_{FHS\_ij} = \begin{bmatrix} 0 & 0 & Z_{ijyz} \\ 0 & 0 & -Z_{ijxz} \\ Z_{ijzy} & -Z_{ijzx} & 0 \end{bmatrix}$$

$$Z_{SHC\_ij} = \begin{bmatrix} \frac{Z_{ijxx}-Z_{ijyy}}{2} & \frac{(Z_{ijxy}+Z_{ijyx})}{2} & 0 \\ \frac{(Z_{ijxy}+Z_{ijyx})}{2} & -\frac{(Z_{ijxx}-Z_{ijyy})}{2} & 0 \\ 0 & 0 & 0 \end{bmatrix}$$

$$Z_{SHS_{ij}} = \begin{bmatrix} \frac{(Z_{ijxy}+Z_{ijyx})}{2} & -\frac{(Z_{ijxx}-Z_{ijyy})}{2} & 0 \\ -\frac{(Z_{ijxx}-Z_{ijyy})}{2} & -\frac{(Z_{ijxy}+Z_{ijyx})}{2} & 0 \\ 0 & 0 & 0 \end{bmatrix}$$

In general, the receiving antenna voltages are measured while the tool rotates in the borehole. Following the form of Equation 6, the measured voltages may be expressed mathematically in terms of its harmonic voltage coefficients, for example, as follows thereby enabling the harmonic voltage coefficients to be obtained:

$$V_{ij} = V_{DC\_ij} + V_{FHC\_ij}\cos(\theta) + V_{FHS\_ij}\sin(\theta) + V_{SHC\_ij}\cos(2\theta) + V_{SHS\_ij}\sin(2\theta) \quad (8)$$

wherein where $V_{DC\_ij}$ represents a DC voltage coefficient, and represent first order harmonic cosine and first order harmonic sine voltage coefficients (also referred to herein as first harmonic cosine and first harmonic sine voltage coefficients), and $V_{SHC\_ij}$ and $V_{SHS\_ij}$ represent second order harmonic cosine and second order harmonic sine voltage coefficients (also referred to herein as second harmonic cosine and second harmonic sine voltage coefficients) of the ij transmitter receiver couplings.

Symmetrized and anti-symmetrized directional resistivity quantities have been disclosed in U.S. Pat. Nos. 6,969,994 and 7,536,261 which are incorporated by reference herein in their entireties. The symmetrized measurement tends to be sensitive to bed boundaries and less sensitive to anisotropy and dip while the anti-symmetrized measurement tends to be sensitive to anisotropy and dip and less sensitive to bed boundaries. In general, the symmetrized quantity is taken to be proportional to a difference between the xz and zx cross-coupling impedances while the anti-symmetrized quantity is taken to be proportional to a sum of the xz and zx cross-coupling impedances, for example, as follows:

$$S = 2(Z_{xz} - Z_{zx})$$

$$A = 2(Z_{xz} + Z_{zx}) \quad (8)$$

where S and A represent the symmetrized and anti-symmetrized quantities and $Z_{xz}$ and $Z_{zx}$ represent the xz and the zx cross-coupling impedances. Combining the expressions given in Equation 8 (via addition and subtraction) and rearranging yields the following expressions in which the symmetrized and anti-symmetrized quantities are given in terms of combinations of the products of the cross-coupling impedances, for example, as follows:

$$S = \sqrt{Z_{xz}^2 + Z_{zx}^2 - 2Z_{xz}Z_{zx}}$$

$$A = \sqrt{Z_{xz}^2 + Z_{zx}^2 + 2Z_{xz}Z_{zx}} \quad (9)$$

With reference to FIG. 4, the electromagnetic measurements may be acquired and processed at 104 to obtain harmonic voltage coefficients, for example, as describe above with respect to Equations 1 through 8. The measured voltages may be related to the impedances between between the transmitter and receiver antennas as also described above. The DC, first harmonic cosine, and first harmonic sine voltage coefficients may be expressed, for example, as follows in terms of the couplings and the respective transmitter and receiver gains:

$$V_{DC\_11xx} = g_{T1x}g_{R1x}\frac{z_{11xx} + z_{11yy}}{2}; \quad (10)$$

$$V_{DC\_22xx} = g_{T2x}g_{R2x}\frac{z_{22xx} + z_{22yy}}{2}$$

$$V_{DC\_11zz} = g_{T1z}g_{R1z}z_{11zz}; \; V_{DC\_22zz} = g_{T2z}g_{R2z}z_{22zz}$$

$$V_{FHC\_12xz} = g_{T1x}g_{R2z}z_{12xz}; \; V_{FHC\_21xz} = g_{T2x}g_{R1z}z_{21xz}$$

$$V_{FHC\_12zx} = g_{T1z}g_{R2x}z_{12zx}; \; V_{FHC\_21zx} = g_{T2z}g_{R1x}z_{21zx}$$

$$V_{FHS\_12xz} = g_{T1x}g_{R2z}z_{12yz}; \; V_{FHS\_21xz} = g_{T2x}g_{R1z}z_{21yz}$$

$$V_{FHS\_12zx} = g_{T1z}g_{R2x}z_{12zy}; \; V_{FHS\_21zx} = g_{T2z}g_{R1x}z_{21zy}$$

where $g_{T1z}$, $g_{T2z}$ and $g_{T1x}$, $g_{T2x}$ represent the gains of the first and second, axial and transverse transmitter antennas, $g_{R1z}$, $g_{R2z}$ and $g_{R1x}$, $g_{R2x}$ represent the gains of the first and second, axial and transverse receiver antennas, $V_{DC\_11xx}$ and $V_{DC\_22xx}$ are the DC voltages obtained from the first and second x directed receivers when the corresponding x directed transmitters fire, $V_{DC\_11zz}$ and $V_{DC\_22zz}$ are the DC voltages obtained from the first and second z directed receivers when the corresponding z directed transmitters fire, $V_{FHC\_ijxz}$ ($V_{FHS\_ijxz}$) are the first harmonic cosine (sine) voltages obtained at the z directed receivers when the x directed transmitters fire, and $V_{FHC\_ijzx}$ ($V_{FHS\_ijzx}$) are the first harmonic cosine (sine) voltages obtained at the x directed receivers when the z directed transmitters fire.

Selected ratios of the DC, first harmonic cosine, and first harmonic sine voltage coefficients given in Equation 10 may be processed at 106, for example, to compute the gain compensated products of the cross-coupling impedances given in Equation 9. It will be understood that the xz and zx cross coupling impedances are also referred to herein as couplings or cross couplings. Following the notation and antenna spacing described above with respect to FIG. 2B, the compensated products of the cross-coupling impedances given in Equation 9 may be obtained, for example, by computing the following ratios:

$$R_{zx} = \frac{V_{FHC\_12zx} \cdot V_{FHC\_21xz}}{V_{DC\_22xx} \cdot V_{DC\_11zz}} \sim Z_{zx}^2 \quad (11)$$

$$R_{xz} = \frac{V_{FHC\_12xz} \cdot V_{FHC\_21zx}}{V_{DC\_11xx} \cdot V_{DC\_22zz}} \sim Z_{xz}^2$$

$$R1_{xzzx} = \frac{V_{FHC\_12zx} \cdot V_{FHC\_12xz}}{V_{DC\_12xx} \cdot V_{DC\_12zz}} \sim Z_{zx}Z_{xz}$$

$$R2_{xzzx} = \frac{V_{FHC\_21zx} \cdot V_{FHC\_21xz}}{V_{DC\_21xx} \cdot V_{DC\_21zz}} \sim Z_{xz}Z_{zx}$$

It will be readily apparent that the ratios in Equation 11 are fully gain compensated (that is the gains given in Equation 10 cancel upon computing the ratios). These ratios may be utilized to obtain the symmetrized and anti-symmetrized quantities, for example, as follows:

$$Scx = \sqrt{R_{xz} + R_{zx} - \text{scale}(R1_{xzzx} + R2_{xzzx})}$$

$$Acx = \sqrt{R_{xz} + R_{zx} + \text{scale}(R1_{xzzx} + R2_{xzzx})} \quad (12)$$

where Scx and Acx represent the gain compensated symmetrized and anti-symmetrized quantities in the x direction and scale represents a scaling factor that gives a symmetrized result of zero in a homogeneous anisotropic formation. The scaling factor may be computed from the DC direct coupling impedances, for example, as follows:

$$\text{scale} = \sqrt{\frac{V_{DC\_12zz}V_{DC\_21zz}V_{DC\_12xx}V_{DC\_21xx}}{V_{DC\_11zz}V_{DC\_22zz}V_{DC\_11xx}V_{DC\_22xx}}} \quad (13)$$

Likewise, corresponding gain compensated ratios $R_{zy}$, $R_{yz}$, $R1_{yzzy}$, and $R2_{yzzy}$ may be computed by replacing the first harmonic cosine coefficients in Equation 10 with corresponding first harmonic sine coefficients from Equation 10, for example, as follows:

$$R_{zy} = \frac{V_{FHS\_12zx} \cdot V_{FHS\_21xz}}{V_{DC\_22xx} \cdot V_{DC\_11zz}} \sim Z_{zy}^2 \quad (14)$$

$$R_{yz} = \frac{V_{FHS\_12xz} \cdot V_{FHS\_21zx}}{V_{DC\_11xx} \cdot V_{DC\_22zz}} \sim Z_{yz}^2$$

$$R1_{yzzy} = \frac{V_{FHS\_12zx} \cdot V_{FHS\_12xz}}{V_{DC\_12xx} \cdot V_{DC\_12zz}} \sim Z_{zy}Z_{yz}$$

$$R2_{yzzy} = \frac{V_{FHS\_21zx} \cdot V_{FHS\_21xz}}{V_{DC\_21xx} \cdot V_{DC\_21zz}} \sim Z_{yz}Z_{zy}$$

The symmetrized and anti-symmetrized quantities in the y direction may then be computed, for example, as follows:

$$Scy = \sqrt{R_{yz} + R_{zy} - \text{scale}(R1_{yzzy} + R2_{yzzy})}$$

$$Acx = \sqrt{R_{yz} + R_{zy} + \text{scale}(R1_{yzzy} + R2_{yzzy})} \quad (15)$$

It will be understood that taking the square root of a quantity can introduce a sign (or phase) ambiguity. Even with careful unwrapping of the phase in Equations 12, 13, and 15 symmetrized directional measurements Scx and Scy in Equations 12 and 15 may have the same sign whether an approaching bed is above or below the measurement tool. The correct sign may be selected, for example, via selecting the sign of the phase or attenuation of the following relation:

$$TSDx = \sqrt{R_{zx}} - \sqrt{R_{xz}}$$

$$TSDy = \sqrt{R_{zy}} - \sqrt{R_{yz}} \quad (16)$$

where $R_{zx}$ and $R_{xz}$ are given in Equation 11 and $R_{zy}$ and $R_{yz}$ are given in Equation 14. Similarly the anti-symmetrized directional measurements Acx and Acy in Equations 12 and 15 may have the same sign whether the dip azimuth of the anisotropy is less than 180 degrees or greater than 180 degrees. This sign ambiguity may be resolved, for example, by taking the sign of the phase or attenuation of the following relation.

$$TADx = \sqrt{R_{zx}} + \sqrt{R_{xz}}$$

$$TADy = \sqrt{R_{zy}} + \sqrt{R_{yz}} \quad (17)$$

The symmetrized and anti-symmetrized measurements may now be re-defined, for example, as follows to eliminate the sign ambiguity.

$$Scx = \frac{2\mathrm{sign}(\mathrm{angle}(TSDx))}{\sqrt{R_{zx}+R_{xz}-\mathrm{scale}(R1_{xz_{zx}}+R2_{xz_{zx}})}}$$

$$Scy = \frac{2\mathrm{sign}(\mathrm{angle}(TSDy))}{\sqrt{R_{zy}+R_{yz}-\mathrm{scale}(R1_{yz_{zy}}+R2_{yz_{zy}})}}$$

$$Acx = \frac{2\mathrm{sign}(\mathrm{angle}(TADx))}{\sqrt{R_{zx}+R_{xz}+\mathrm{scale}(R1_{xz_{zx}}+R2_{xz_{zx}})}}$$

$$Acy = \frac{2\mathrm{sign}(\mathrm{angle}(TADy))}{\sqrt{R_{zy}+R_{yz}+\mathrm{scale}(R1_{yz_{zy}}+R2_{yz_{zy}})}} \quad (18)$$

Since the quantities in Equation 18 are proportional to gain compensated symmetrized and anti-symmetrized directional couplings they may be rotated to a fixed Earth reference frame. For example, a symmetrized angle may be obtained from the real and/or imaginary components of the symmetrized ratios in Equation 18:

$$\phi_{s\_real} = a\tan 2(\mathrm{real}(Scy),\mathrm{real}(Scx))$$

$$\phi_{s\_imag} = a\tan 2(\mathrm{imag}(Scy),\mathrm{imag}(Scx)) \quad (19)$$

where $\phi_{s\_real}$ represents the symmetrized angle obtained from the real components of the symmetrized quantities and $\phi_{s\_imag}$ represents the symmetrized angle obtained from the imaginary components of the symmetrized quantities. The symmetrized angle $\phi_s$ may also be obtained by taking a weighted average of the angles in Equation 19, for example, as follows:

$$\varphi_s = \frac{1}{N_{sr} N_{si}} (N_{sr}\varphi_{s\_real} + N_{si}\varphi_{s\_imag}) \quad (20)$$

where $N_{sr}$ and $N_{si}$ are given as follows:

$$N_{sr} = \sqrt{(\mathrm{real}(Scx))^2 + (\mathrm{real}(Scy))^2}$$

$$N_{si} = \sqrt{(\mathrm{imag}(Scx))^2 + (\mathrm{imag}(Scy))^2}$$

The anti-symmetrized angle may be obtained similarly, for example, as follows:

$$\phi_{a\_real} = a\tan 2(\mathrm{real}(Acy),\mathrm{real}(Acx))$$

$$\phi_{a\_imag} = a\tan 2(\mathrm{imag}(Acy),\mathrm{imag}(Acx)) \quad (21)$$

where $\phi_{a\_real}$ represents the anti-symmetrized angle obtained from the real components of the anti-symmetrized quantities and $\phi_{a\_imag}$ represents the anti-symmetrized angle obtained from the imaginary components of the anti-symmetrized quantities. The symmetrized angle $\phi_a$ may also be obtained by taking a weighted average of the angles in Equation 19, for example, as follows:

$$\varphi_a = \frac{1}{N_{ar}+N_{ai}} (N_{ar}\varphi_{a\_real} + N_{ai}\varphi_{a\_imag}) \quad (22)$$

where $$N_{ar} = \sqrt{(\mathrm{real}(Acx))^2 + (\mathrm{real}(Acy))^2}$$

$$N_{ai} = \sqrt{(\mathrm{imag}(Acx))^2 + (\mathrm{imag}(Acy))^2}$$

Using the symmetrized and anti-symmetrized angles (e.g., given in Equations 20 and 22), the quantities may be rotated to line up with heterogeneities in the subterranean formation (e.g., with the anisotropy in the bedding layers), for example, as follows:

$$S_c = Scx\cos(\phi_s) - Scy\sin(\phi_s)$$

$$A_c = Acx\cos(\phi_s) - Acy\sin(\phi_a) \quad (23)$$

where $S_c$ and $A_c$ represent gain compensated symmetrized and anti-symmetrized quantities lined up with the formation. Gain compensated symmetrized directional phase shift and attenuation measurements TDSP and TDSA may then be defined, for example, as follows:

$$TDSP = \frac{180}{\pi}\mathrm{angle}(1+Sc) \quad (24)$$

$$TDSA = 20\log 10(1+Sc)$$

Likewise, gain compensated anti-symmetrized directional phase shift and attenuation TDAP and TDAA measurements may also be defined, for example, as follows:

$$TDAP = \frac{180}{\pi}\mathrm{angle}(1+Ac) \quad (25)$$

$$TDAA = 20\log 10(1+Ac)$$

It will be understood that the gain compensated symmetrized and anti-symmetrized directional phase shift and attenuation measurements may be scaled using substantially any suitable scaling factor(s), for example, such that they correspond with conventional symmetrized and anti-symmetrized measurements (such as disclosed in U.S. Pat. Nos. 6,969,994 and 7,536,261).

Figure 5:
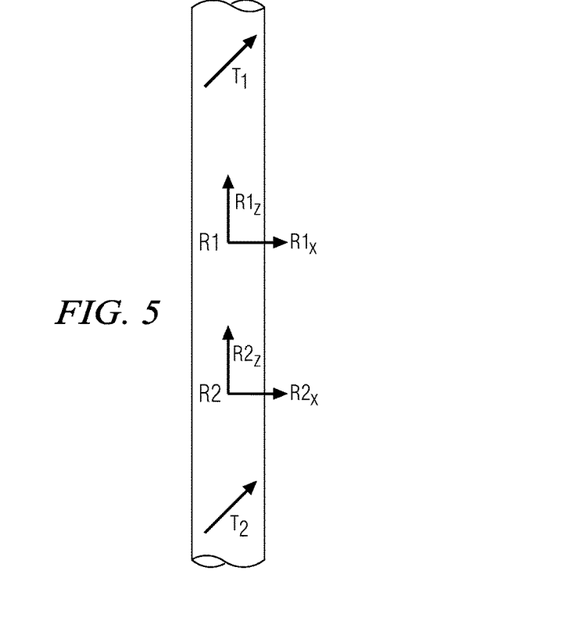
FIG. 5 depicts antenna moments for an electromagnetic logging tool including tilted transmitters

FIG. 5 depicts the antenna moments for an electromagnetic logging tool including tilted transmitters T1 and T2. The transmitters are deployed about axially spaced receivers R1 and R2, each of which includes collocated axial and transverse antennas $R_{1z}$, $R_{1x}$ and $R_{2z}$, $R_{2x}$. The measurement tool depicted on FIG. 5 may be used to obtain the gain compensated symmetrized and anti-symmetrized measurements described above. For example, with respect to Equation 10, the DC, first harmonic cosine, and first harmonic sine voltage coefficients may be expressed as follows:

$$V_{DC\_11xx} = g_{T1}g_{R1x}\sin(\beta_{T1})\frac{z_{11xx}+z_{11yy}}{2}; \quad (26)$$

$$V_{DC\_22xx} = g_{T2}g_{R2x}\sin(\beta_{T2})\frac{z_{22xx}+z_{22yy}}{2}$$

$$V_{DC\_11zz} = g_{T1}g_{R1z}\cos(\beta_{T1})Z_{11zz}; V_{DC\_22zz} = g_{T2}g_{R2z}\cos(\beta_{T2})Z_{22zz}$$

$$V_{FHC\_12xz} = g_{T1}g_{R2z}\sin(\beta_{T1})Z_{12xz}; V_{FHC\_21xz} = g_{T2}g_{R1z}\sin(\beta_{T2})Z_{21xz}$$

$$V_{FHC\_12zx} = g_{T1}g_{R2x}\cos(\beta_{T1})Z_{12zx}; V_{FHC\_21zx} = g_{T2}g_{R1x}\cos(\beta_{T2})Z_{21zx}$$

$$V_{FHS\_12xz} = g_{T1}g_{R2z}\sin(\beta_{T1})Z_{12yz}; V_{FHS\_21xz} = g_{T2}g_{R1z}\sin(\beta_{T2})Z_{21yz}$$

$$V_{FHS\_12zx} = g_{T1}g_{R2x}\cos(\beta_{T1})Z_{12zy}; V_{FHS\_21zx} = g_{T2}g_{R1x}\cos(\beta_{T2})Z_{21zy}$$

where $\beta_{T1}$ and $\beta_{T2}$ represent the tilt angles between the T1 and T2 antenna moments and the axis of the electromagnetic measurement tool. Notice that $\sin(\beta_{T1})$, $\sin(\beta_{T2})$, $\cos(\beta_{T1})$, and $\cos(\beta_{T2})$ may be lumped with the transmitter gains such that $g_{T1x} = g_{T1}\sin(\beta_{T1})$, $g_{T2x} = g_{T2}\sin(\beta_{T2})$, $g_{T1z} = g_{T1}\cos(\beta_{T1})$, and $g_{T2z} = g_{T2}\cos(\beta_{T2})$. The sine and cosine terms thus cancel in computing the aforementioned ratios (in Equations 11 and 14) in the same way that the transmitter gains cancel. The methodology therefore compensates for tilt angle and tilt angle variation as well as transmitter and receiver gains. In this way any of the gain compensated compensated quantities described above with respect to Equations 8-25 may be computed using a measurement tool including tilted transmitters as depicted on FIG. 5.

Figure 6:
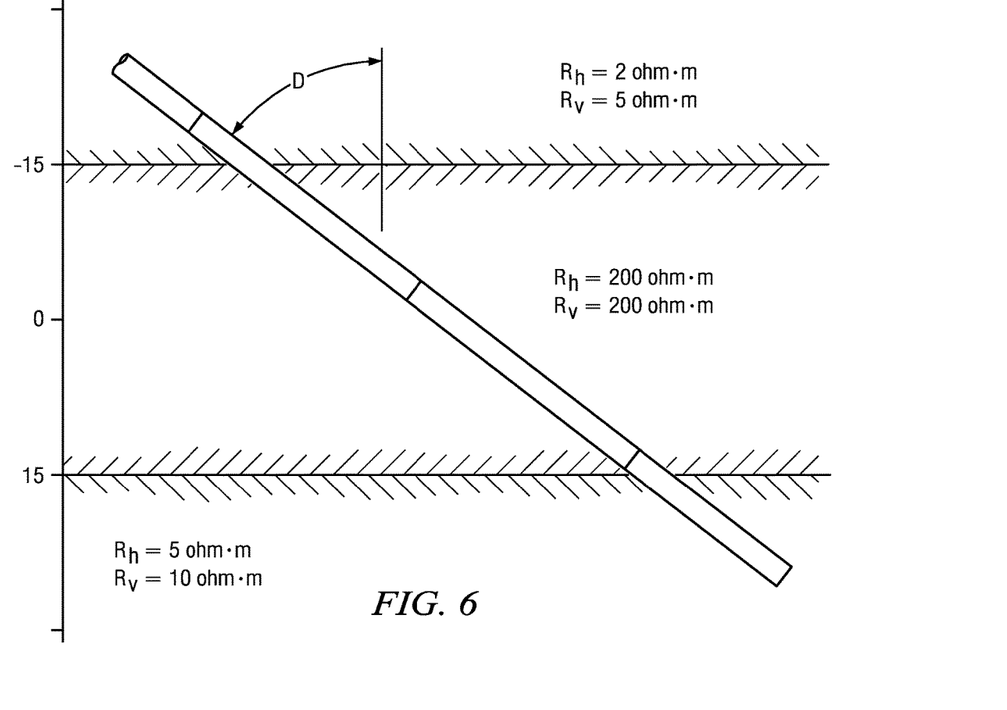
FIG. 6 depicts a three layer formation model used to evaluate the directional response of disclosed gain compensated symmetrized and anti-symmetrized measurements.
Figure 7A:
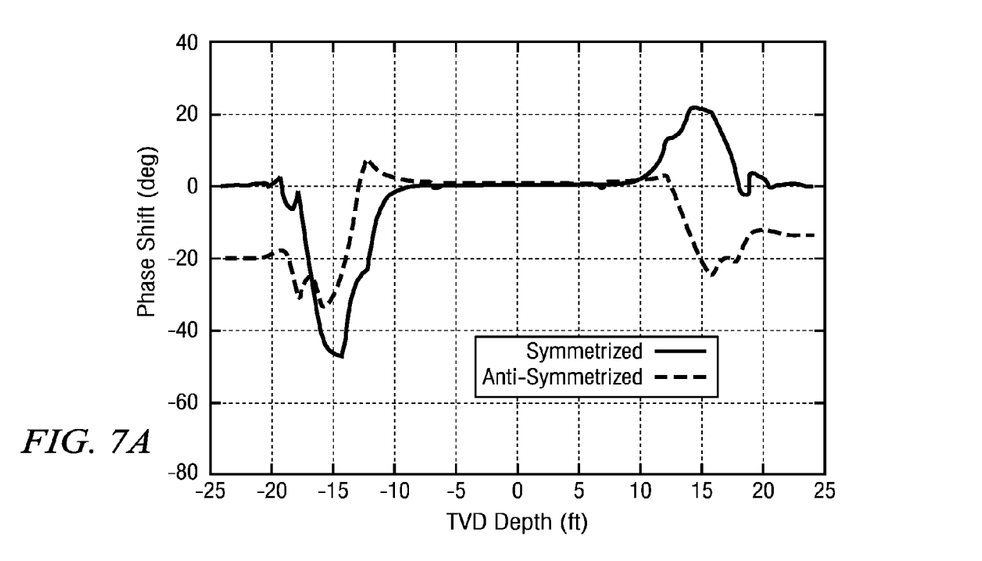
FIGS. 7A and 7B (collectively FIG. 7) depict gain compensated symmetrized and anti-symmetrized phase shift and attenuation versus total vertical depth at 30 degrees relative dip.
Figure 7B:
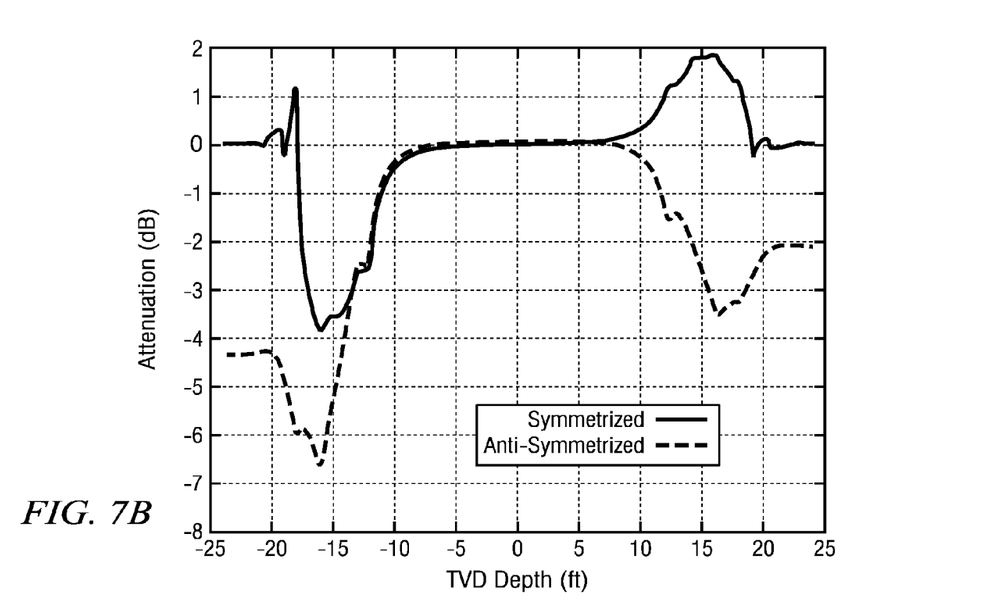
Figure 8A:
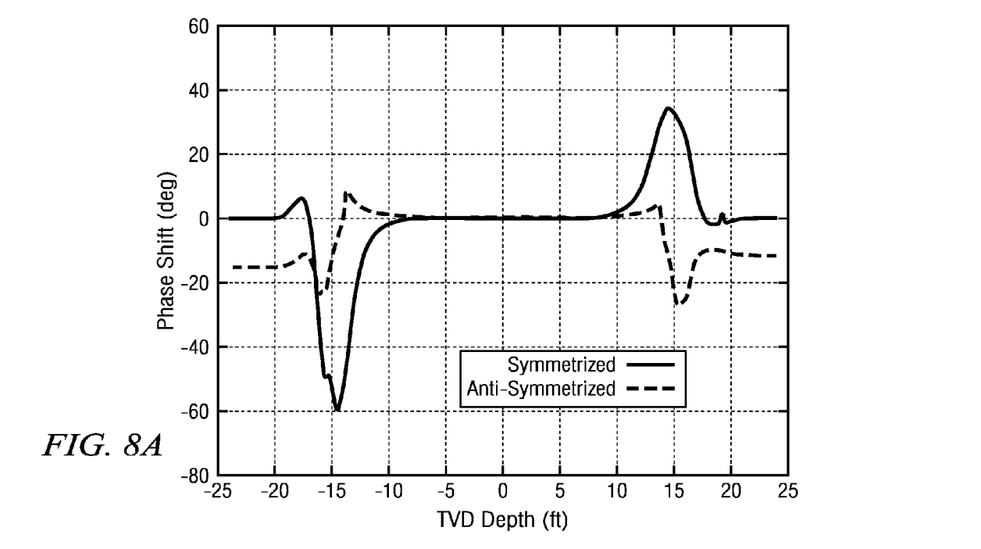
FIGS. 8A and 8B (collectively FIG. 8) depict gain compensated symmetrized and anti-symmetrized phase shift and attenuation versus total vertical depth at 70 degrees relative dip.
Figure 8B:
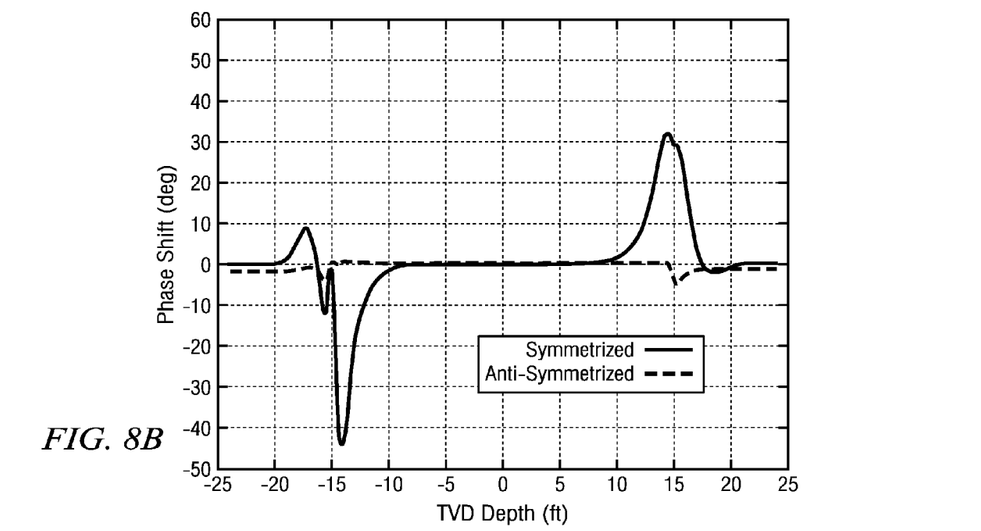

The disclosed embodiments are now described in further detail with respect to the following non-limiting examples in FIGS. 6-8. These examples are analytical (mathematical) and were computed using Equations 23-25 via software code developed using a point dipole model.

FIG. 6 depicts a three-layer formation model used to evaluate the response of the compensated symmetrized and anti-symmetrized measurement quantities described above. The upper layer had a horizontal resistivity of 2 ohm·m and a vertical resistivity of 5 ohm·m. The middle layer had horizontal and vertical resistivities of 200 ohm·m while the lower layer had a horizontal resistivity of 5 ohm·m and a vertical resistivity of 10 ohm·m. The upper and lower boundaries of the middle layer were at −15 and +15 feet, respectively, such that the midpoint of the middle layer is at 0 feet. The electromagnetic tool was inclined at a non-zero dip angle D. In the examples that follow (in FIGS. 7 and 8), a tool model configuration similar to that shown on FIG. 2B was utilized (but including only x-axis and z-axis transmitters and receivers). The receiver R1 and transmitter T1 were located at +13 and +40 inches with respect to the midpoint between receivers R1 and R2. The receiver R2 and the transmitter T2 were located at −13 and −40 inches. Zero depth was defined as the depth at which the midpoint between receivers R1 and R2 crossed the midpoint of the middle layer in the formation on FIG. 6.

FIGS. 7A and 7B (collectively FIG. 7) depict gain compensated symmetrized and anti-symmetrized phase shift and attenuation versus total vertical depth at 30 degrees relative dip. FIGS. 8A and 8B (collectively FIG. 8) depict gain compensated symmetrized and anti-symmetrized phase shift and attenuation versus total vertical depth at 70 degrees relative dip. These figures illustrate that the symmetrized quantity is zero away from the bed boundary. Near the boundary, the sign changes depending on whether the bed is approached from above or below. The magnitude of the symmetrized response is substantially independent of anisotropy. The anti-symmetrized quantity is sensitive to anisotropy and dip with comparatively less sensitivity to the bed boundaries.

Figure 9A:
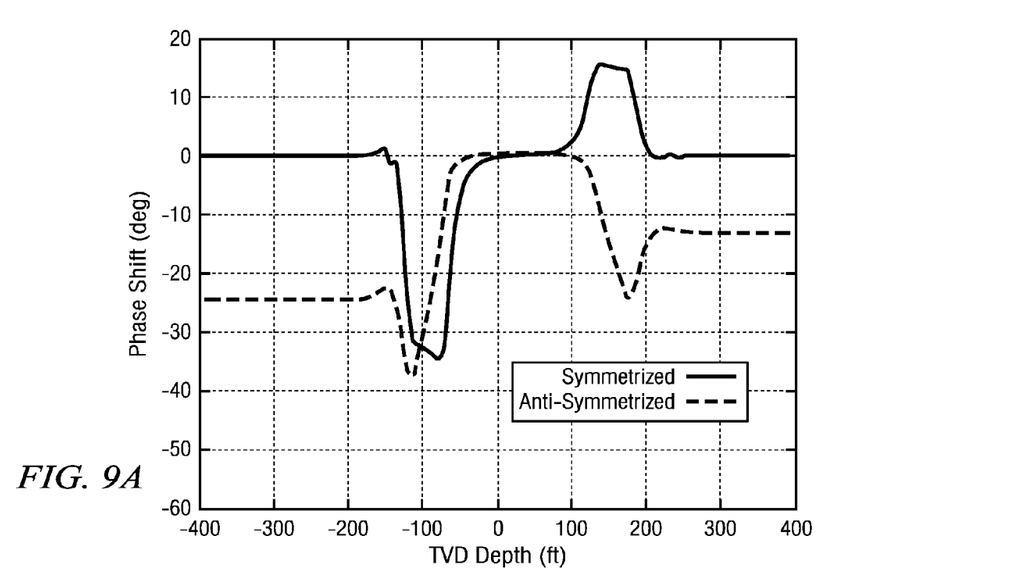
FIGS. 9A and 9B (collectively FIG. 9) depict gain compensated symmetrized and anti-symmetrized phase shift and attenuation versus total vertical depth at 30 degrees relative dip.
Figure 9B:
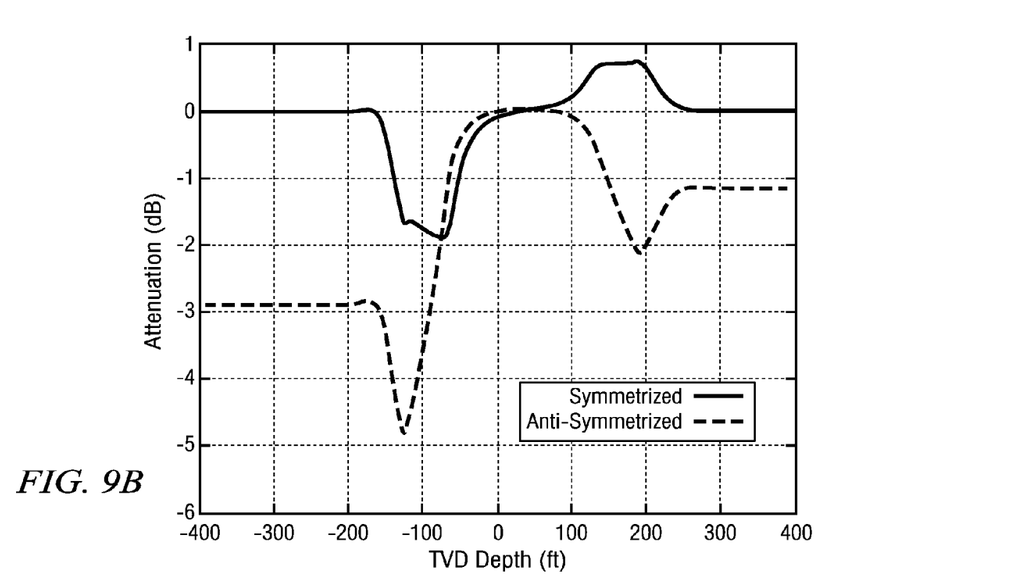
Figure 10A:
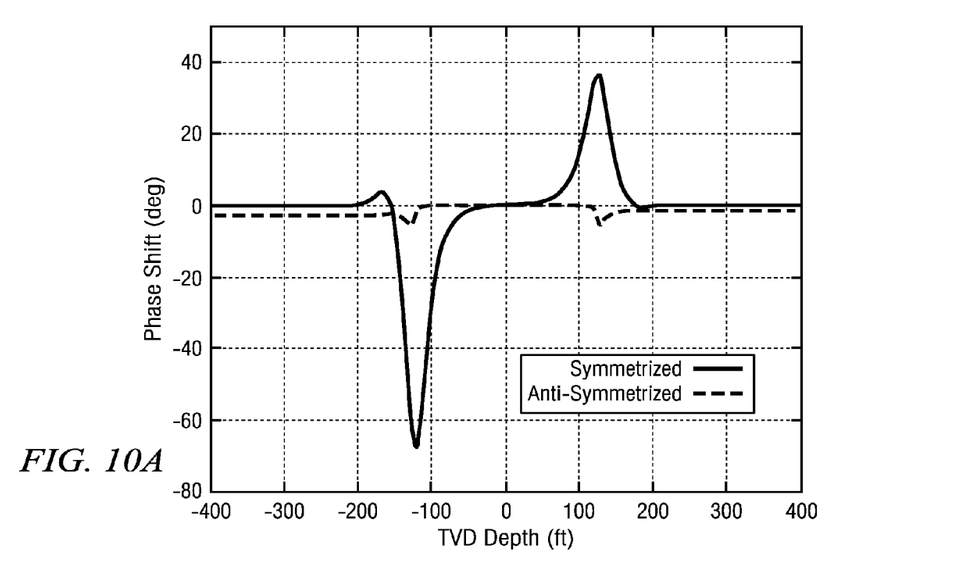
FIGS. 10A and 10B (collectively FIG. 10) depict gain compensated symmetrized and anti-symmetrized phase shift and attenuation versus total vertical depth at 88 degrees relative dip.
Figure 10B:
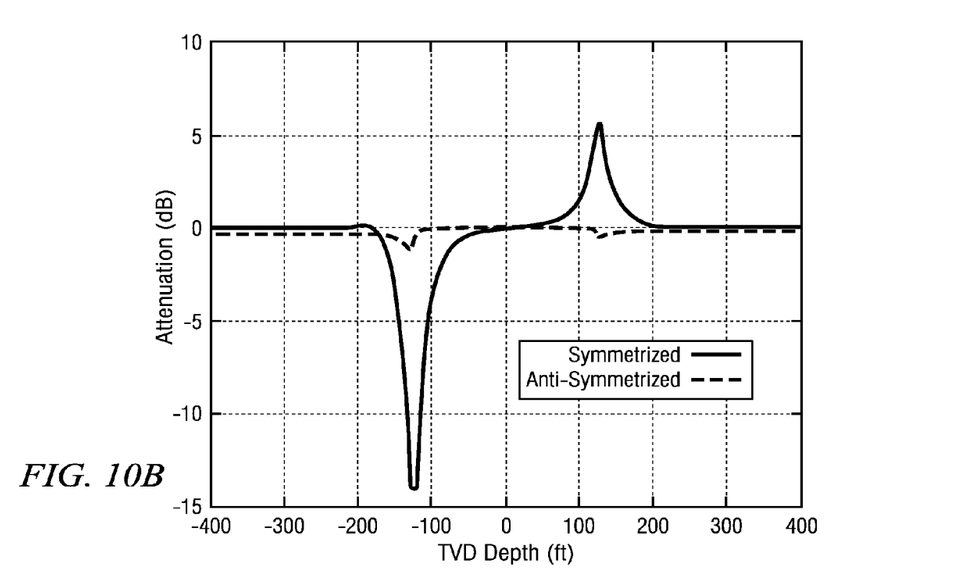

The disclosed embodiments are further described with respect to the following non-limiting examples in FIGS. 9-10. These examples are analytical (mathematical) and were computed using Equations 23-25 via software code developed using a point dipole model using a three-layer model and a tool model configuration similar to that described above with respect to FIG. 6. In particular, the three layer model included three layers having identical vertical and horizontal resistivity values. However, the upper and lower boundaries were at of the middle layer were at −125 and +125 feet with respect to the midpoint of the middle layer. The tool model configuration employed identical transmitters and receivers, but with different spacing. The receiver R1 and transmitter T1 were located at +25 and +35 feet with respect to the midpoint between receivers R1 and R2. The receiver R2 and the transmitter T2 were located at −25 and −35 feet with respect to the midpoint.

FIGS. 9A and 9B (collectively FIG. 9) depict gain compensated symmetrized and anti-symmetrized phase shift and attenuation versus total vertical depth at 30 degrees relative dip. FIGS. 10A and 10B (collectively FIG. 10) depict gain compensated symmetrized and anti-symmetrized phase shift and attenuation versus total vertical depth at 88 degrees relative dip. These figures demonstrate utility for deep propagation operations and illustrate that the symmetrized quantity is zero away from the bed boundary. Near the boundary, the sign changes depending on whether the bed is approached from above or below. The magnitude of the symmetrized response is substantially independent of anisotropy. The anti-symmetrized quantity is sensitive to anisotropy and dip with comparatively less sensitivity to the bed boundaries.

Figure 11:
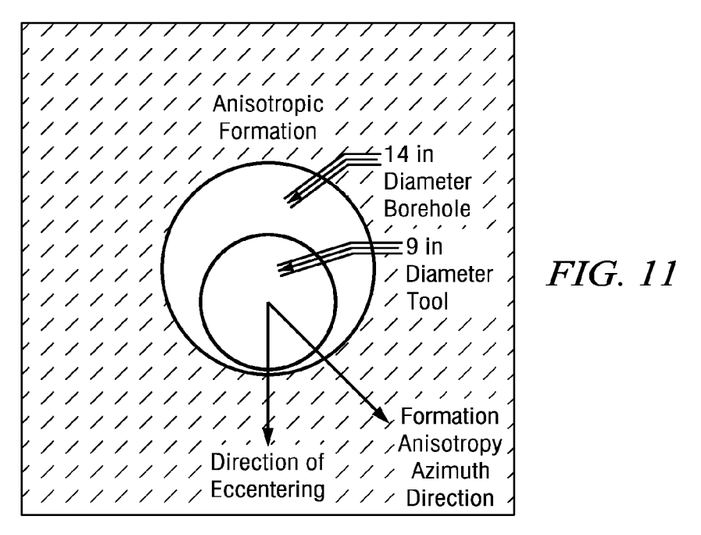
FIG. 11 depicts a borehole and formation model used to evaluate the directional response of disclosed gain compensated symmetrized and anti-symmetrized measurements.
Figure 12:
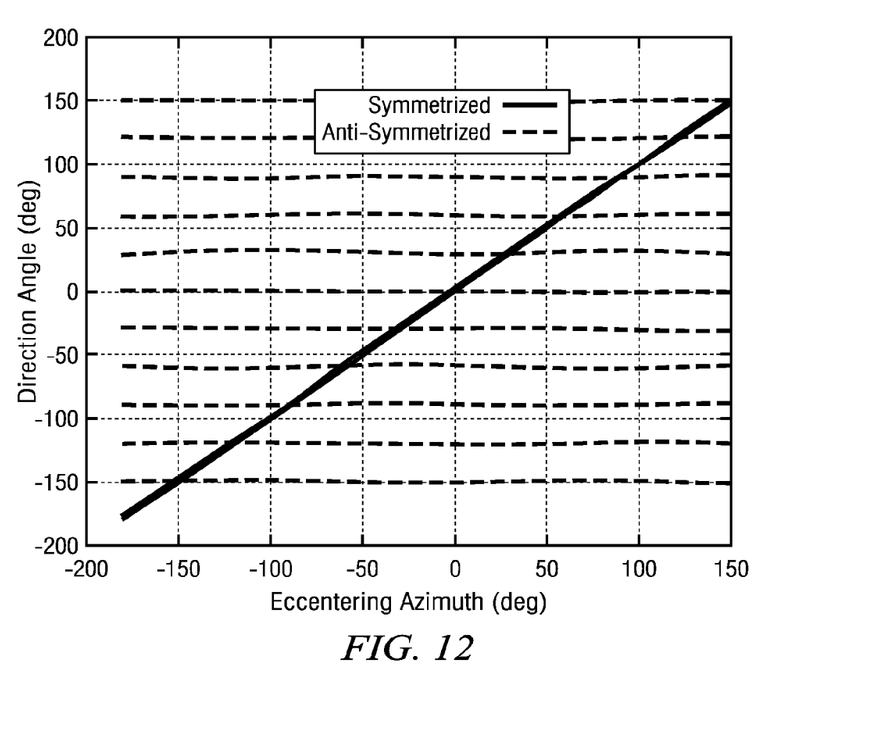
FIG. 12 depicts a plot of the direction angle versus the eccentering azimuth for the gain compensated symmetrized and anti-symmetrized angles when varying the angle at which the tool in FIG. 11 is eccentered.
Figure 13:
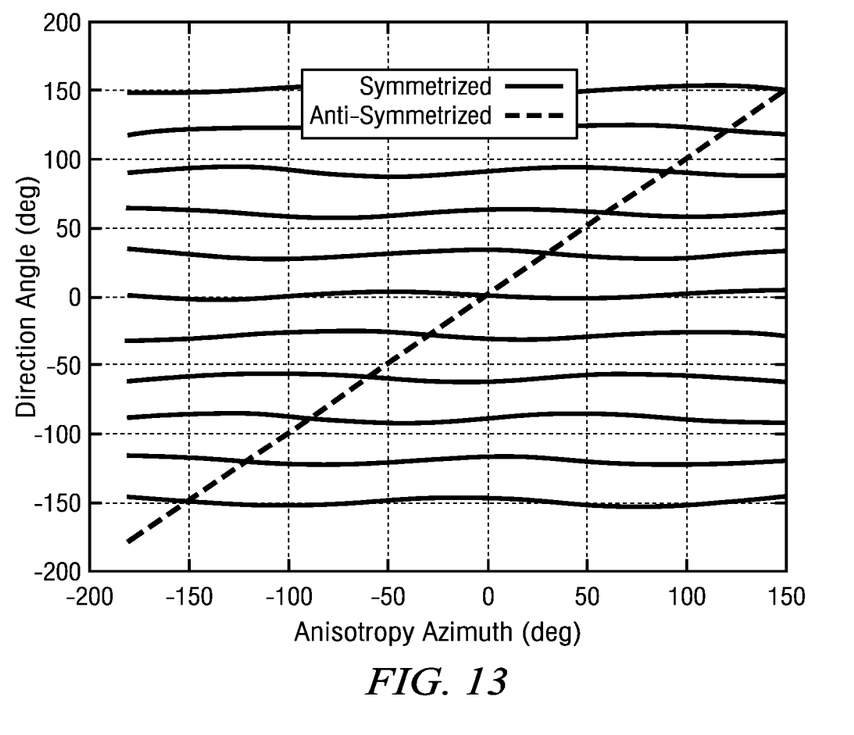
FIG. 13 depicts a plot of the direction angle versus the anisotropy azimuth for the gain compensated symmetrized and anti-symmetrized angles when varying the azimuth of the formation anisotropy in FIG. 11.

The disclosed embodiments are still further described with respect to the following non-limiting examples in FIGS. 11-13. These examples are analytical (mathematical) and were computed using Equations 18-22 via software code developed using a point dipole model using a single-layer model and the tool/wellbore configuration similar depicted on FIG. 11. As depicted, a tool having a 9-inch diameter was eccentered in a 14-inch diameter wellbore drilled through an anisotropic medium having a horizontal resistivity of 1 ohm·m and a vertical resistivity of 5 ohm·m at a dip angle of 30 degrees. The hole was assumed to be filled with an oil-base mud having a very high resistivity (as compared to the formation). The tool receiver R1 and transmitter T1 were located at +12 and +38 inches with respect to the midpoint between receivers R1 and R2. The receiver R2 and the transmitter T2 were located at −12 and −38 inches.

FIG. 12 depicts a plot of the direction angle versus the eccentering azimuth for the gain compensated symmetrized and anti-symmetrized angles when varying the angle at which the tool in FIG. 11 is eccentered. Note that the gain compensated symmetrized angle is approximately proportional to the eccentering azimuth while the gain compensated anti-symmetrized angle is substantially independent of the eccentering angle. FIG. 13 depicts a plot of the direction angle versus the anisotropy azimuth for the gain compensated symmetrized and anti-symmetrized angles when varying the azimuth of the formation anisotropy in FIG. Note that the gain compensated anti-symmetrized angle is approximately proportional to the anisotropy azimuth while the gain compensated symmetrized angle is substantially independent of the anisotropy angle.

It will be understood that the various methods disclosed herein for obtaining fully gain compensated quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the fully gain compensated quantities may be stored in downhole memory and/or transmitted to the surface while drilling via known telemetry techniques (e.g., mud pulse telemetry or wired drill pipe). Alternatively, the harmonic fitting coefficients may be transmitted uphole and the compensated quantities may be computed at the surface using a surface processor. Whether transmitted to the surface or computed at the surface, the quantity may be utilized in an inversion process (along with a formation model) to obtain various formation parameters as described above.

Although gain compensated directional propagation measurements have been described in detail, it should be understood that various changes, substitutions and alternations can be made herein without departing from the spirit and scope of the disclosure as defined by the appended claims.

What is claimed is:

1. A method for making downhole electromagnetic logging while drilling measurements, the method comprising:
   (a) rotating an electromagnetic logging while drilling tool in a subterranean wellbore, the logging tool including a plurality of transmitter antennas and a plurality of receiver antennas symmetrically spaced along a logging while drilling tool body, the plurality of transmitter antennas including at least one axial transmitter antenna and at least one transverse transmitter antenna, the plurality of receiver antennas including at least one axial receiver antenna and at least one transverse receiver antenna;
   (b) acquiring a plurality of electromagnetic voltage measurements from the plurality of receiver antennas while rotating in (a);
   (c) processing the voltage measurements acquired in (b) to compute harmonic voltage coefficients;
   (d) processing ratios of selected ones of the harmonic voltage coefficients to compute gain compensated symmetrized and anti-symmetrized quantities and angles; and
   (e) processing the gain compensated symmetrized and anti-symmetrized quantities and angles to compute rotated symmetrized and anti-symmetrized quantities, the rotated symmetrized and anti-symmetrized quantities being rotated to align with heterogeneities of a subterranean formation surrounding the wellbore.

2. The method of claim 1, wherein the processing in (d) is performed by a downhole processor.

3. The method of claim 1, further comprising:
   (f) processing the rotated symmetrized and anti-symmetrized quantities to compute gain compensated symmetrized phase shift and attenuation and gain compensated anti-symmetrized phase shift and attenuation.

4. The method of claim 3, further comprising:
   (g) transmitting the gain compensated symmetrized phase shift and attenuation and gain compensated anti-symmetrized phase shift and attenuation to a surface location; and
   (h) causing a surface computer to invert the gain compensated symmetrized phase shift and attenuation and gain compensated anti-symmetrized phase shift and attenuation to obtain one or more properties of the subterranean formation.

5. The method of claim 1, wherein the harmonic voltage coefficients computed in (c) comprise at least DC, first order harmonic sine, and first order harmonic cosine voltage coefficients.

6. The method of claim 1, wherein the logging tool includes first and second axial transmitter antennas and first and second transverse transmitter antennas, the axial receiver antenna and the transverse receiver antenna being deployed between (i) the first axial transmitter antenna and the first transverse transmitter antenna on one axial end and (ii) the second axial transmitter antenna and the second transverse transmitter antenna on another axial end.

7. The method of claim 1, wherein the logging tool includes first and second axial receiver antennas and first and second transverse receiver antennas, the axial transmitter antenna and the transverse transmitter antenna being deployed between (i) the first axial receiver antenna and the first transverse receiver antenna on one axial end and (ii) the second axial receiver antenna and the second transverse receiver antenna on another axial end.

8. The method of claim 1, wherein the logging tool includes first and second transmitters and first and second receivers, each of the transmitters including a collocated axial transmitter antenna and transverse transmitter antenna and each of the receivers including a collocated axial receiver antenna and a transverse receiver antenna.

9. A method for making downhole electromagnetic logging while drilling measurements, the method comprising:
   (a) rotating an electromagnetic logging while drilling tool in a subterranean wellbore, the logging tool including a plurality of transmitting antennas and a plurality of receiver antennas symmetrically spaced along a logging while drilling tool body, the plurality of transmitter antennas including at least one axial transmitter antenna and at least one transverse transmitter antenna, the plurality of receiver antennas including at least one axial receiver antenna and at least one transverse receiver antenna;
   (b) acquiring a plurality of electromagnetic voltage measurements from the axial and transverse receiver antennas while rotating in (a);
   (c) processing the voltage measurements acquired in (b) to compute harmonic voltage coefficients;
   (d) processing selected ones of the harmonic voltage coefficients to compute a plurality of gain compensated ratios of the harmonic voltage coefficients;
   (e) processing the plurality of gain compensated ratios to compute gain compensated symmetrized and anti-symmetrized quantities and angles; and
   (f) processing the gain compensated symmetrized and anti-symmetrized quantities and angles to compute rotated symmetrized and anti-symmetrized quantities, the rotated symmetrized and anti-symmetrized quantities being rotated to align with heterogeneities of a subterranean formation surrounding the wellbore.

10. The method of claim 9, wherein the harmonic voltage coefficients comprise at least DC voltage coefficients, first order harmonic cosine voltage coefficients, and first order harmonic sine voltage coefficients.

11. The method of claim 10, wherein each of the plurality of gain compensated ratios comprises a ratio of a first product of first order harmonic voltage coefficients to a second product of DC voltage coefficients.

12. The method of claim 11, wherein the first order harmonic voltage coefficients comprise first order harmonic cosine voltage coefficients.

13. The method of claim 11, wherein the first order harmonic voltage coefficients comprise first order harmonic sine voltage coefficients.

14. The method of claim 9, wherein (e) further comprises:
   (i) processing the plurality of gain compensated ratios to compute first and second gain compensated symmetrized quantities and first and second gain compensated anti-symmetrized quantities; and
   (ii) processing the first and second gain compensated symmetrized quantities to compute a symmetrized angle and the first and second gain compensated anti-symmetrized quantities to compute an anti-symmetrized angle.

15. The method of claim 9 wherein (e) further comprises:
   (i) processing the plurality of gain compensated ratios to compute first and second gain compensated symmetrized quantities and first and second gain compensated anti-symmetrized quantities;
   (ii) processing imaginary components of the first and second gain compensated symmetrized quantities to compute an imaginary symmetrized angle and imaginary components of the first and second gain compensated anti-symmetrized quantities to compute an imaginary anti-symmetrized angle;

(iii) processing real components of the first and second gain compensated symmetrized quantities to compute a real symmetrized angle and real components of the first and second gain compensated anti-symmetrized quantities to compute a real anti-symmetrized angle; and (iv) processing a weighted average of the gain compensated real and imaginary symmetrized angles to obtain a first gain compensated symmetrized angle and a weighted average of the gain compensated real and imaginary anti-symmetrized angles to obtain a first gain compensated anti-symmetrized angle.

16. The method of claim 15, further comprising:

(v) processing the first and second gain compensated symmetrized quantities and the first gain compensated symmetrized angle to compute a first rotated gain compensated symmetrized quantity; and (vi) processing the first and second gain compensated anti-symmetrized quantities and the first gain compensated anti-symmetrized angle to compute a first rotated gain compensated anti-symmetrized quantity.

17. The method of claim 16, further comprising:

(g) processing the rotated symmetrized and anti-symmetrized quantities to compute gain compensated symmetrized phase shift and attenuation and gain compensated anti-symmetrized phase shift and attenuation;

(h) transmitting the gain compensated symmetrized phase shift and attenuation and gain compensated anti-symmetrized phase shift and attenuation to a surface location; and (i) causing a surface computer to invert the gain compensated symmetrized phase shift and attenuation and gain compensated anti-symmetrized phase shift and attenuation to obtain one or more properties of the subterranean formation.

18. An electromagnetic logging while drilling tool comprising:

a logging while drilling tool body;

first and second transmitters deployed on the tool body, each of the first and second transmitters including an axial transmitter antenna and a transverse transmitter antenna;

first and second receivers deployed on the tool body, each of the first and second receivers including an axial receiver antenna and a transverse receiver antenna;

a controller configured to (i) cause the axial transmitter antennas and the transverse transmitter antennas to transmit corresponding electromagnetic waves; (ii) acquire electromagnetic voltage measurements from the axial and transverse receiver antennas while the axial transmitter antennas and the transverse transmitter antennas are transmitting; (iii) process the electromagnetic voltage measurements to compute harmonic voltage coefficients; (iv) process ratios of selected ones of the harmonic voltage coefficients to compute gain compensated symmetrized and anti-symmetrized quantities and angles, and (v) process the gain compensated symmetrized and anti-symmetrized quantities and angles to compute rotated symmetrized and anti-symmetrized quantities, the rotated symmetrized and anti-symmetrized quantities rotated to align with heterogeneities of a subterranean surrounding the wellbore.

19. The logging while drilling tool of claim 18, wherein:

the axial transmitter antenna and the transverse transmitter antenna in each of the first and second transmitters are collocated; and the axial receiver antenna and the transverse receiver antenna in each of the first and second receivers are collocated.

* * * * *